US005435941A

United States Patent [19]
Von Fraunhofer

[11] Patent Number: 5,435,941
[45] Date of Patent: Jul. 25, 1995

[54] TOBACCO EXTRACT COMPOSITION AND METHOD
[75] Inventor: Joseph A. Von Fraunhofer, Baltimore, Md.
[73] Assignee: University of Louisville, Louisville, Ky.
[21] Appl. No.: 349,966
[22] Filed: Dec. 6, 1994

Related U.S. Application Data

[63] Continuation-in-part of Ser. No. 169,777, Dec. 17, 1993, abandoned.
[51] Int. Cl.⁶ .............. C23F 11/14; C23F 11/173; C23F 11/18; C09D 5/08
[52] U.S. Cl. .................. 252/392; 252/387; 252/393; 252/394; 252/396; 106/14.13; 106/14.14; 106/14.15; 106/14.16; 106/14.17; 106/14.34; 106/14.35; 106/14.37; 106/14.39; 422/16; 422/17; 131/290; 131/297; 131/300
[58] Field of Search ............ 252/393, 392, 394, 387, 252/396; 106/14.22, 14.13, 14.14, 14.15, 14.16, 14.17, 14.34, 14.35, , 14.37, 14.39; 422/16, 17; 131/290, 297, 300

[56] References Cited

U.S. PATENT DOCUMENTS

| | | | |
|---|---|---|---|
| 50,006 | 9/1865 | Hyde | 424/197.1 |
| 54,345 | 5/1866 | Hickson | 424/197.1 |
| 88,519 | 3/1869 | Russell . | |
| 176,688 | 4/1876 | Rosenthal | 424/197.1 |
| 229,130 | 6/1880 | Hill | 424/197.1 |
| 256,847 | 4/1882 | Mayer | 424/197.1 |
| 264,182 | 9/1882 | Merrell . | |
| 282,949 | 8/1883 | Be Vier | 424/197 |
| 406,698 | 7/1889 | Boogher | 252/180 |
| 728,258 | 5/1903 | Lockwood | 210/698 |
| 1,717,905 | 6/1929 | Alsberg | 210/698 |
| 1,810,946 | 6/1931 | Calcott et al. | 568/701 |
| 1,841,763 | 1/1932 | Sanftleben | 252/180 |
| 1,938,677 | 12/1933 | Alsberg | 210/23 |
| 1,950,494 | 3/1934 | Kobseff | 87/27 |
| 2,111,684 | 3/1938 | Venable | 87/27 |
| 2,221,815 | 11/1940 | Rice | 210/23 |
| 2,281,392 | 4/1942 | Smead | 252/180 |
| 2,411,074 | 11/1946 | Winkelmann | 252/83 |
| 2,777,818 | 1/1957 | Gambill | 252/8.55 |
| 3,317,431 | 5/1967 | Kaye | 252/180 |
| 3,596,766 | 8/1971 | Johnston | 210/58 |
| 3,656,553 | 4/1972 | Rainaldi et al. | 169/47 |
| 3,710,803 | 1/1973 | Johnson | 131/140 P |
| 3,985,728 | 10/1976 | Lin | 536/120 |
| 4,131,117 | 12/1978 | Kite | 131/370 |
| 4,131,118 | 12/1978 | Gellatly et al. | 131/373 |
| 4,183,364 | 1/1980 | Gumushan | 131/143 |
| 4,253,929 | 3/1981 | Keritis | 204/182.4 |
| 4,557,966 | 12/1985 | Weil | 428/209 |
| 4,589,428 | 5/1986 | Keritsis | 131/297 |
| 5,065,775 | 11/1991 | Fagg | 131/297 |
| 5,119,835 | 6/1992 | Heemann et al. | 131/297 |
| 5,143,097 | 9/1992 | Sohn | 131/356 |
| 5,243,999 | 9/1993 | Smith | 131/297 |

FOREIGN PATENT DOCUMENTS 680567 10/1952 United Kingdom .

OTHER PUBLICATIONS

Derwent Abstract 11984x/07 (JP) 50–91546).
Derwent Abstract 91–135948/19 (JP–33072–091–A).
Derwent Abstract 87–174899/25 (J6–2107–092–A).
Derwent Abstract 77698W/47 (J5–0051–938).
Derwent Abstract 22385y/13 (J5–0093–241).
Derwent Abstract 89–162012/22 (JO–1104–787–A).
Derwent Abstract 682548–EHM (DT–1446335–R).
Derwent Abstract 069534/04 (SU–510–534).
Derwent Abstract 289765–EM (DT–169147–R).
Derwent Abstract 00039S–EGM (CA–859637).
Chemical Abstract 115:119758.
Chemical Abstract 117:73842.
Chemical Abstract 84: 8215.
Chemical Abstract 115:284617.

*Primary Examiner*—Gary L. Geist
*Assistant Examiner*—Valerie Fee
*Attorney, Agent, or Firm*—Prince, Yeates & Geldzahler

[57] ABSTRACT

A method of extracting corrosion inhibiting constituents from tobacco comprises the steps of soaking tobacco in an aqueous solution under certain extraction conditions, followed by filtration to remove tobacco residue from the resultant aqueous tobacco solution. This tobacco solution is used as a corrosion inhibitor to minimize the amount of corrosion occurring at galvanic corrosion cells that are established at areas of union of metals having different electrochemical potentials.

15 Claims, 9 Drawing Sheets

Type A Inhibitors
Type IA:   reduce corrosion rate but do not completely prevent corrosion
Type IIA:  provide temporary immunity by delaying onset of corrosion
Type IIIA: form passive film (oxide or insoluble salt) on metal surface

Type B Inhibitors
Type IB:   retard corrosion process and are consumed during protective action
Type IIB:  provide temporary immunity by reacting with corrosives Types IA, IIA and IIB are usually organic compounds
Types IIIA and IB are usually inorganic compounds

*Fig. 1*

| Class of Compound | Concentration (mg/kg) |
|---|---|
| Terpenes and alcohols | 350 |
| Polyphenols | 30 |
| Carboxylic acids | 2100 |
| Nitrogen-containing compounds | 240 |
| Alkaloids | 5-50 |

*Fig. 2*

TOBACCO EXTRACT COMPOSITION AND METHOD

RELATED APPLICATION

This application is a continuation in part of my application entitled Tobacco Extract Composition and Method, Ser. No. 08/169,777, filed Dec. 17, 1993, now abandoned.

BACKGROUND OF THE INVENTION

1. Field of the Invention

The present invention relates to a composition and methods for production and use of industrial chemicals extracted from biomass, and more specifically, to a tobacco extract for corrosion inhibition treatment of metallic surfaces.

2. Description of the Prior Art

Corrosion is defined as the loss of the essential metallic properties of a metal. Corrosion consumes increasingly scarce raw materials and wastes the energy expended in the extraction and refining of metals as well as that involved in manufacturing components and structures. Since corrosion affects virtually every aspect of modern civilization, corrosion prevention is of major economic and environmental importance.

One approach to corrosion control is to add an inhibitor to the system. One way an inhibitor works is that it reacts with the metal to form a protective surface film. Typical examples are the inhibitors added to automobile cooling systems and corrosion-inhibiting pigments in protective paints for metals. However, many corrosion inhibitors in current use are toxic and/or have an adverse effect on the environment. There is increasing legislative pressure for the elimination of heavy metal compounds and toxic organic and inorganic corrosion inhibitors such that the development of effective and environmentally-friendly inhibitors is of major importance.

There have been few advances in the development of novel and effective corrosion inhibitors in recent years, while at the same time, there is a legislation-driven trend to eliminate many of the inhibitors in common use. Thus, inhibitors based on heavy metals, e.g., lead compounds, chromates, and those containing a variety of toxic anions, e.g., nitrites, phosphates and benzoates, are no longer acceptable. Consequently, a high proportion of corrosion inhibitors currently used in chemical industry, paint technology, metal finishing, cooling systems, and so forth require replacement by environmentally-acceptable substances. There is, however, little information on environmentally-acceptable corrosion inhibitors.

SUMMARY OF THE INVENTION

Tobacco products contain high concentrations of alkaloids, fatty acids and N-containing compounds, many of which inhibit metallic corrosion. Compounds leached from tobacco with water have the ability to inhibit metallic corrosion. In particular, tobacco extracts inhibit the galvanic corrosion of steel when coupled to copper in a sodium chloride solution, a solution known to rapidly corrode iron and steel. In fact, tobacco extracts appear to be more effective in inhibiting corrosion than the well known inhibitor, potassium chromate, under the same conditions.

There are numerous advantages of using tobacco extract as a metallic corrosion inhibitor. Initially, tobacco is a natural, renewable, environmentally benign, and relatively inexpensive source. In addition to leaves, tobacco waste (stems, twigs, etc.) can be used for corrosion inhibitor extraction. The active constituents (metallic corrosion inhibitors) in tobacco can be readily, inexpensively, and commercially extracted in a simple operation using only water as an extraction medium. In addition, the corrosion inhibitors in tobacco constituents can be extracted in a variety of additional or alternative media, as in steam, organic solvents, acids, etc. Treating metals and metallic surfaces with the extracted corrosion inhibitors can be effected by a number of currently used commercial methods, as in by dip or spray coating, electrostatic coating, or by formulating the corrosion inhibitors with paint or other coatings to be applied to the metallic surfaces in conventional commercial methods.

BRIEF DESCRIPTION OF THE DRAWINGS

FIG. 1 is a listing of Type A and Type B corrosion inhibitors.

FIG. 2 is a table of the average concentrations in dry tobacco leaves of electrochemically active compounds.

DETAILED DESCRIPTION OF THE INVENTION

Figure 3:
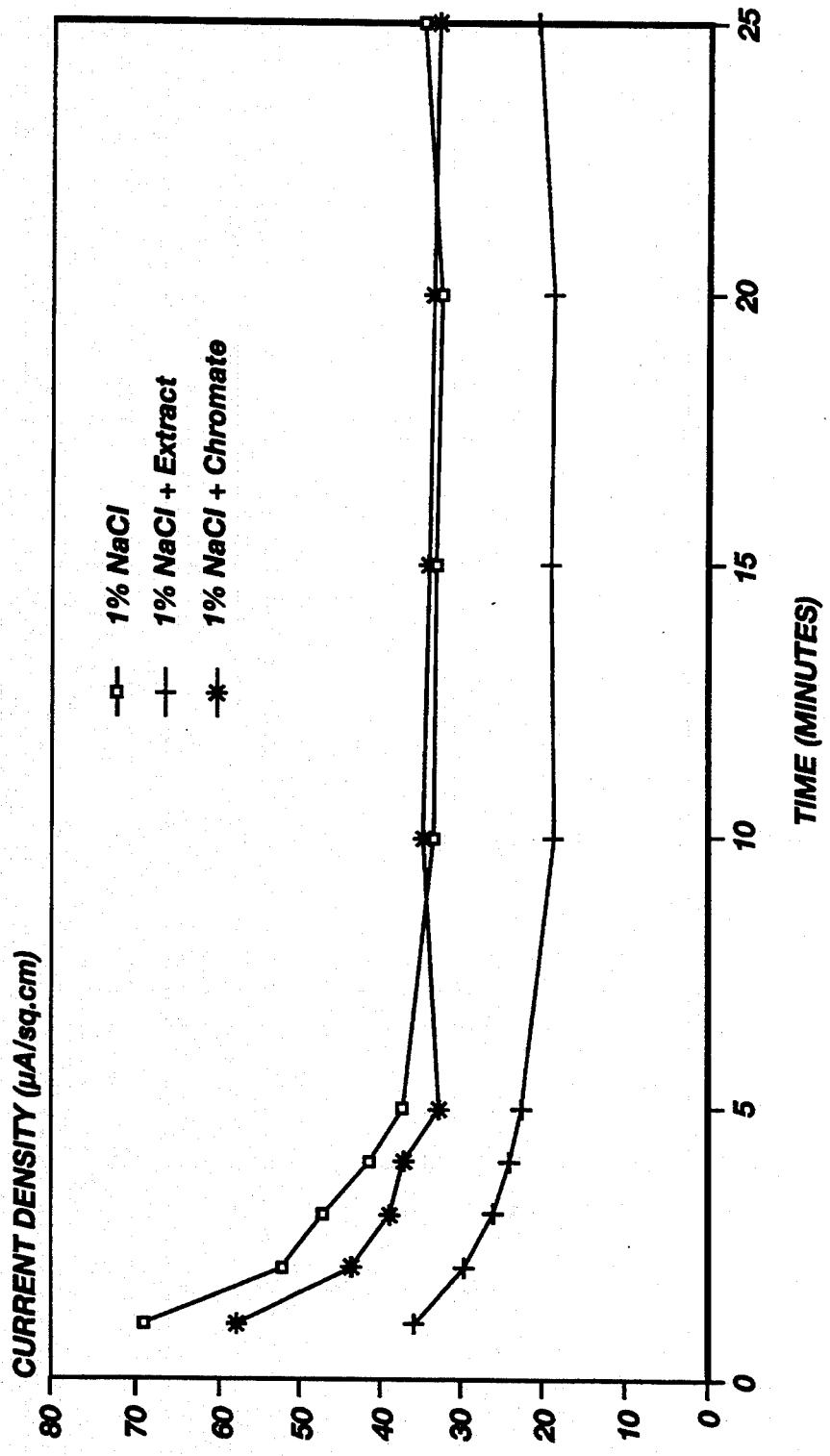
FIG. 3 is a current density/time relationship graph of a copper-steel galvanic couple in solutions of saline, saline and potassium chromate, and saline and tobacco extract.

Virtually all metals and alloys are subject to corrosion. One of the most common examples is surface discoloration, e.g., tarnish of silver or rusting of steel. Metal destruction by corrosion occurs through loss of metal ions directly into solution or by progressive dissolution of a surface film, typically an oxide or sulfide compound of the metal. Uniform attack is less destructive than localized or pitting attack, and the latter may cause catastrophic failure of structures or engineering components when there is progressive corrosion within the bulk of the metal.

Very few metals, e.g., gold and platinum, are inert, and most others rely upon an oxide film for their resistance to corrosion. Disruption of the protective film or the presence of a medium that causes dissolution of the film and prevents its re-formation will result in corrosion. Even in the absence of disruptive effects such as abrasion or scratching, oxide films often slowly dissolve or fall away from the metal surface, and then reform as the exposed metal surface is exposed to air or oxygen from its surrounding medium.

Corrosion is an electrochemical process, that is, there is passage of an electric current and movement of ions or electroactive species through solution followed by reaction at electrodes. Corrosion, therefore, results in the consumption of metals through reaction with their environment. Inhibition (prevention) of corrosion therefore involves transport of appropriate electroactive species through solution to the reacting metal surface, the electrode, where there is interaction with the metal surface and a reduction in the rate of metal dissolution. The deleterious effects of corrosion range from the unsightly tarnishing of silver, to the expensive rusting of automobiles, to a wide variety of allergic reactions from metals, to the almost incalculable costs of structural failures that result in loss of production and loss of life. Accordingly, corrosion prevention is of major importance. Four principal approaches are used in its prevention, namely, materials selection, surface coatings, anodic or cathodic protection, and environment modification.

Corrosion involves two concomitant reactions, an oxidation reaction at the anode and a reduction reaction at the cathode. In the case of zinc corroding in dilute acid, these reactions are:

Anode: $Zn \rightarrow Zn^{2+} + 2e$

Cathode: $2H^+ + 2e \rightarrow H_2$

These two reactions proceed at equal and opposite rates. In neutral and high pH media, the predominant cathodic reaction is reduction of oxygen to hydroxyl ions.

In most corrosion processes, the anodic reaction will continue until there is total consumption of the metal, unless (1) the metal can form a protective surface film ("passivation"), (2) the cathodic reactant is consumed (e.g., exhaustion without replenishment of dissolved oxygen in solution), or (3) the corrosion process is inhibited by additives to the medium. Depending upon the thermodynamics and kinetics of the overall reaction, corrosion may proceed slowly or rapidly, and occur as a general or localized attack. It is common, for example, that a pure metal may resist attack by a given reagent but will corrode quite rapidly when it contains impurities that facilitate an otherwise thermodynamically and/or kinetically unfavorable reaction. Similar effects occur if the medium contains a more readily reducible cathodic reactant than oxygen. For example, the atmospheric pollutant $SO_2$ is some 1600 times more soluble in water than is oxygen ($O_2$), and is more readily reduced so that corrosion of steel occurs far more rapidly in urban (polluted) atmospheres than in rural areas.

When two metals are connected together in an electrolyte or conducting solution, the more electronegative metal will become the anode and corrode, while the more electropositive metal functions as the cathode. This form of corrosion cell is known as a galvanic cell or galvanic couple. This is the basis for the well-known protection of iron by galvanizing or zinc coating, where the zinc corrodes preferentially to the iron and is termed a sacrificial anode. Similar principles are utilized for the protection of underground pipelines, offshore oil rigs, shipping, etc.

Galvanic corrosion is common and numerous examples are known. Galvanic couples may be set up on areas of passivated (oxide coated) metals at breaks in the oxide layers or at perforations ("holidays") in protective coatings. Further, corrosion may be accelerated when a galvanic cell is established such that there is stimulation of the corrosion rate of a corrosion-resistant metal or of a metal that exhibits a low corrosion rate only in the absence of such cells. Galvanic couples may be established under a number of different circumstances. In all cases, differences in electrochemical potential between two metals or at different sites on the same metal will cause the creation of galvanic cells which result in corrosion.

The effects of galvanic corrosion vary with the nature and type of the individual galvanic cell. Extensive literature exists on corrosion and galvanic corrosion cells. One of the most common examples of galvanic corrosion is that occurring in the cooling system of automobile engines due to the presence of a variety of metals, typically cast iron, mild steel, copper and aluminum, as well as soldered and welded joints within the cooling system itself. In addition, ethylene glycol antifreeze is very corrosive towards metals. Necessarily, therefore, all cooling systems require some form of corrosion inhibition, typically a benzoate-nitrite mixture.

Appropriate selection of materials may prevent, or at least significantly reduce, many corrosion problems, but considerations of cost, manufacturing methods, service requirements and conditions often dictate the choice of materials. Surface coatings, typically electrodeposited metals, galvanizing, polymeric coatings and paints, are used to provide corrosion protection, often through a barrier effect. Anodic or cathodic protection methods, typically sacrificial anodes or impressed current systems, are widely used for large structures such as buried pipelines, oil drilling rigs, ships and within chemical plants, and are very effective. Finally, when corrosion cannot be controlled by other means, modification of the environment may be required.

Environment modification involves either removal of corrosive agents or the addition of inhibitors, compounds that react with the metal to form a protective surface film or which remove or react with corrosive agents. Corrosion control in automotive cooling systems relies on inhibitors, typically a combination of sodium benzoate and sodium nitrite, added to protect the multi-component cooling system from corrosion by ethylene glycol antifreeze.

A combination of barrier action and inhibition occurs with protective paint coatings which contain leachable inhibitors that are transported to the metal substrate surface with ingress of fluids, and provide protection at the possible sites of attack. Protective paint coatings are a major method of protecting structures against corrosion, and they have the great advantage that they can be "tailored" to specific requirements and applications.

The selection of corrosion inhibitors used in industry and as pigments in protective paints, however, has been markedly affected by two legislation-driven developments, notably, the elimination of heavy metals and their compounds, and the impetus to use water-borne paints in place of organic solvent-borne paint systems. As a result, many traditional and highly effective inhibitor systems such as lead compounds, chromates and phosphates, are already prohibited or will shortly be prohibited on the grounds of toxicity and/or environmental effects. Environmental considerations have resulted in increased application of latex (water-borne) paints in place of solvent-borne or "oil-based" paints. Both trends significantly impact upon the formulation of protective paints and the methods of coating application. In brief, the paint industry and industry in general face a growing and urgent need to develop environmentally-acceptable and non-toxic corrosion inhibitors that function effectively in aqueous media.

It is well established that certain substances will reduce and sometimes stop attack by acids on metals, this effect being known as inhibition of corrosion. In fact, numerous compounds can act as inhibitors in a wide variety of media. These compounds fall into two major classes of corrosion inhibitor, Type A and Type B, as shown in FIG. 1. Type A inhibitors react with the metal, typically by forming an inhibiting layer or film on the surface, while Type B inhibitors act by reducing the aggressiveness of the environment. Only Type IA and IIA inhibitors are relevant to this application of tobacco products.

There is no single mechanism of inhibitor action. However, Type A inhibitors (metal affecters) have been studied most. Types IA and IIA function by reacting with the metal (1) to form a surface film or (2) through selective adsorption onto active anodic (or cathodic) sites on the surface. This adsorption, even in the absence of metal-inhibitor chemical interactions, polarizes the anodic and/or cathodic reaction to provide the corrosion inhibition. Many Type IIA inhibitors incubate corrosion by forming chelate-type reaction products with the metal. In this type reaction, corrosion is inhibited as long as the chelate is present on the surface, with corrosion resuming if the chelate is decomposed or displaced by another surface film.

It is the nature of the chemisorbed layer on the metal formed by Type IA and IIA inhibitors, rather than its thickness per se, that determines inhibitor effectiveness. Non-specific adsorption of ions, or molecules that can form ions, depends upon the surface charge of the metal. At the point of zero charge (ZPC or $E^{q=0}$), adsorption of both ions and molecules can occur. When such adsorption occurs, the ZPC is shifted, in the case of anions, to slightly more negative values. For inhibition by anions, the metal must be held positive to its ZPC, i.e., the metal is positively charged. This generally occurs during corrosion of metals in acid solution. In neutral and basic media, an additional agent such as oxygen is generally required to maintain the metal corrosion potential, $E_{corr}$, positive to the ZPC, i.e., $E_{corr} > E^{q=0}$.

Effective adsorbing inhibitors include aliphatic and aromatic amines, sulphur-compounds such as thiourea and substituted thioureas, carboxylic acids and their salts, aldehydes and ketones, as well as numerous other organic substances. These substances exist either in the charged state, e.g., substituted ammonium cations $R_3NH^+$ in acid solution, or as neutral entities that are readily polarizable such that the active nitrogen atom in N-compounds acquires a net positive charge, and the active sulphur and oxygen atoms in S- and O-compounds acquire a net negative charge as the molecule approaches the metal surface. Thus, in addition to the high surface activity or adsorbability of N-, S- and O-compounds due to the polarizability of the active S- and N- atoms in particular, the effect of metal surface charge on adsorption may be predicted. Accordingly, for $E > E^{q=0}$, adsorption of S- and O-compounds is favored while N-compound adsorption is preferred when $E < E^{q=0}$.

Synergistic (and antagonistic) effects are often found with mixtures of inhibitors. These effects may be related to the charge in the electrical double layer (edl) present between an electrode (the metal surface) and its environment. The initial stage of adsorption is strongly influenced by the charge in the edl. Prior adsorption of anions, e.g., $HS^-$ and $Cl^-$, will lower the potential within the edl and so encourage adsorption of positively charged amines and other N-compounds.

The N- and O-type compounds are relatively weakly adsorbed and thus tend to be discriminatory in their action, primarily affecting the anodic sites, although effectiveness of inhibition depends upon the molecular size. The primary bonding agent in adsorption is the lone pair of electrons on the O or N atom, although large molecules provide steric hinderance over both neighboring anodic and cathodic areas so that there is cathodic and anodic inhibition. Aromatic amines and polyamines tend to lie flat on the metal surface. Therefore, their effectiveness of inhibition is a function of the area covered by the molecule, with secondary valence forces holding the molecule to the metal. There have been suggestions that lateral interactions between adjacent adsorbed molecules also increases inhibitive effects.

At least 2549 individual constituents have been identified in tobacco products. However, of this wide variety of constituents, only a limited number are electrochemically active, such activity being dependant upon the presence of the polarizable nitrogen, oxygen and sulphur atoms. Additionally, polynuclear aromatic hydrocarbons might be electrochemically active, due to their fused benzene ring system with its attendant charge dislocation. The average concentrations in dry tobacco leaves of these electrochemically active compounds are summarized in FIG. 2.

Tobacco products contain high concentration of alkaloids, fatty acids and N-containing compounds, but despite the obvious and wide-spread interest and research into the pharmacological and carcinogenic characteristics of tobacco products, there appears to be no literature on their electrochemical behavior.

EXTRACTION PROCEDURE

Initial aqueous extractions were performed in 1% by weight saline solution at 65° C. (149° F.). These initial extractions and galvanic corrosion studies were performed using a saline solution in order to accelerate the corrosion analyses. In these corrosion studies (i.e., electrochemical tests), an electrical conducting electrolyte medium is necessary to ensure electrical continuity (conductivity) in the circuit (the test medium) to permit accurate electrical measurements to be made. Therefore, by initially using a saline (electrically conductive) solution for the aqueous tobacco constituents extraction, the galvanic corrosion analyses could be run immediately.

Following the initial tobacco constituent extractions in 1% saline aqueous solutions, the inventor performed subsequent tobacco constituent extractions in (1) room temperature (22° C., 72° F.) saline solutions; (2) heated and room temperature water solutions; and (3) heated and room temperature 10% sulfuric acid solutions. In each of these tobacco constituent extractions, the mechanical procedure was the same. The tobacco product was stirred into the extraction medium, namely water, saline or acid solution in a large beaker, and was agitated by a magnetic stirrer over a period of 4 hours. The mix was filtered through a standard laboratory filter paper in a conical funnel, and the various metallic surfaces were immersed in individual containers of the filtrate solution for the specified times.

GALVANIC CORROSION STUDIES

The prepared tobacco extract solution was used for specific galvanic corrosion cell zero resistance ammetry analyses of the current density/time relationships of galvanic couples of various metal combinations, and compared to analyses of current density/time relationships of these same galvanic couples in 1% saline solution with and without the addition of 1% potassium chromate. Results of these analyses indicate that extracts leached from these various types of tobacco inhibited corrosion within these galvanic couple corrosion cells in 1% saline solution considerably better than additions of 1% potassium chromate, commonly used as a corrosion inhibitor.

Three series of these electrochemical corrosion tests were performed to evaluate the electrochemical behavior and the corrosion inhibition potential of tobacco constituents and to compare their efficacy with that of aqueous extracts from smokeless tobacco.

Galvanic corrosion cells are established wherever metals of different electrochemical potential are coupled together or where there are differences in electrochemical activity arising from variations in such factors as pH and aeration. Galvanic corrosion currents may be accurately studied by means of zero resistance ammetry, ZRA. In ZRA, the feedback current of the operational amplifier of a potentiostat is used to maintain a zero potential difference between the two metals of the galvanic couple. The magnitude of the feedback current is identical to that flowing in the galvanic cell. This technique was used to obtain the following data:
  a. the magnitude of the corrosion currents flowing in cells formed by combinations of dissimilar metals;
  b. the effect of tobacco constituents on the galvanic corrosion currents;
  c. changes in the effect of tobacco constituents on galvanic corrosion currents as a function of electrolyte pH; and
  d. the effect of elevated temperature on inhibition of galvanic corrosion by tobacco constituents.

The data obtained indicate the protective efficacy of constituents from different tobaccos on corrosion in galvanic cells, and indicate the effect of solution pH and solution temperature on the inhibitive effects.

Accordingly, studies were performed using the rapid and convenient zero resistance ammetry (ZRA) technique.

EXAMPLE 1

A tobacco extract test medium was prepared by digesting 5 g of commercial chewing tobacco (Red Man chewing tobacco, Pinkerton Tobacco Co, Owensboro, Ky.) in 500 ml of 1% saline for a period of 4 hours. A study compared the effects of 1% NaCl solution, 1% saline containing the tobacco extract and 1% saline containing 1% of the known inhibitor, potassium chromate, on the industrially important copper-steel galvanic couple. The current density/time relationships of the galvanic couple in these solutions are shown in FIG. 3. Increased corrosion inhibition is denoted by a lower current density.

This study on the copper-steel galvanic couple clearly shows that a simple aqueous extract of smokeless tobacco leached out a powerful corrosion inhibitor, one that is more effective and more rapid in its action than the well-established anodic passivating inhibitor, potassium chromate.

EXAMPLE 2

Figure 4:
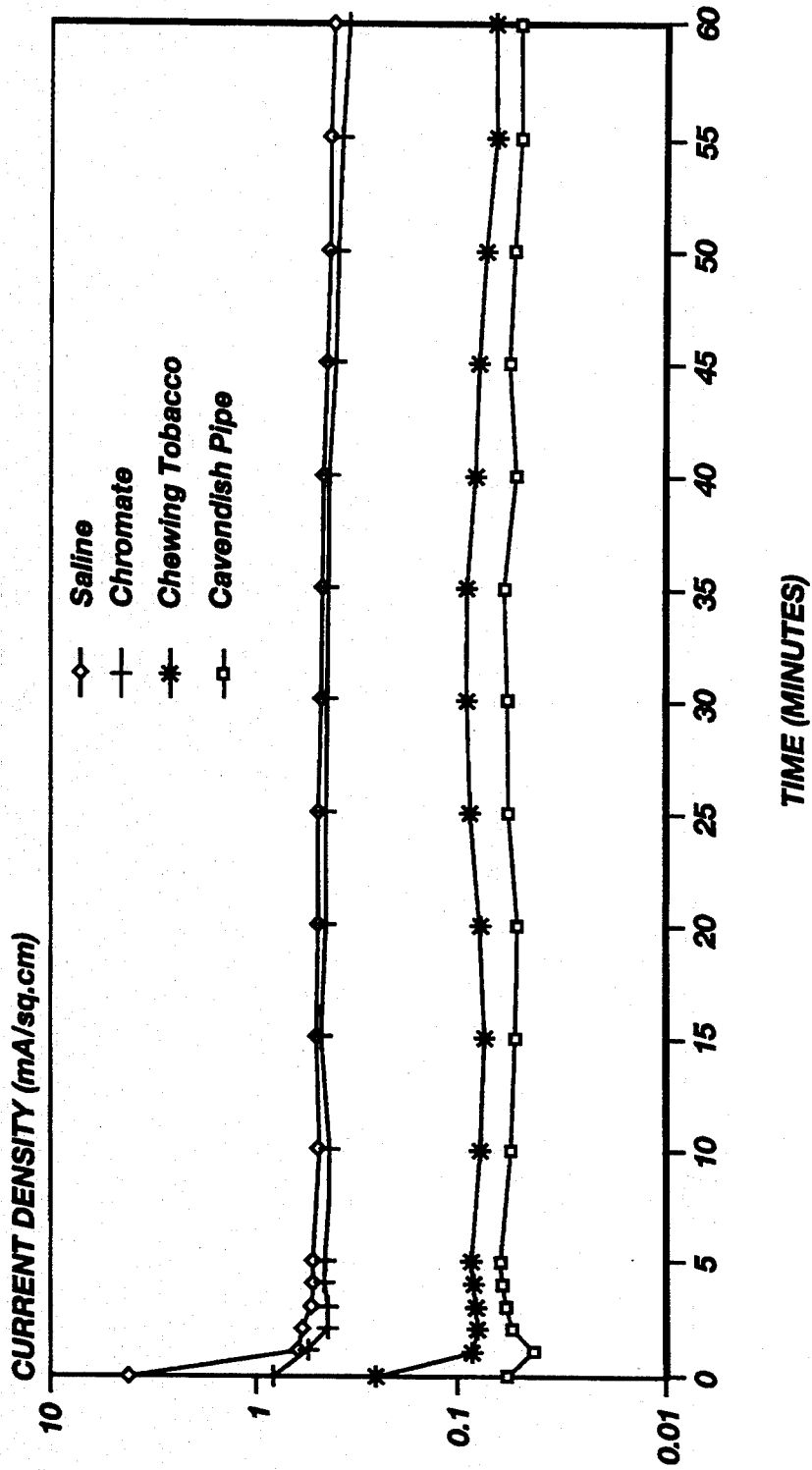
FIG. 4 is a current density/time relationship graph of a steel-platinum galvanic couple in solutions of saline, saline and potassium chromate, saline and chewing tobacco extract, and saline and pipe tobacco extract.

ZRA studies of mild steel coupled to platinum, a very active cathode, in 1% saline solution, with and without potassium chromate, smokeless tobacco extract and Cavendish smoking tobacco extract are shown in FIG. 4. Again, a lower current density denotes a greater degree of corrosion inhibition. Note that both tobacco extracts are more effective corrosion inhibitors, i.e., produce a lower current density, than the standard corrosion inhibitor, potassium chromate.

EXAMPLE 3

Figure 5:
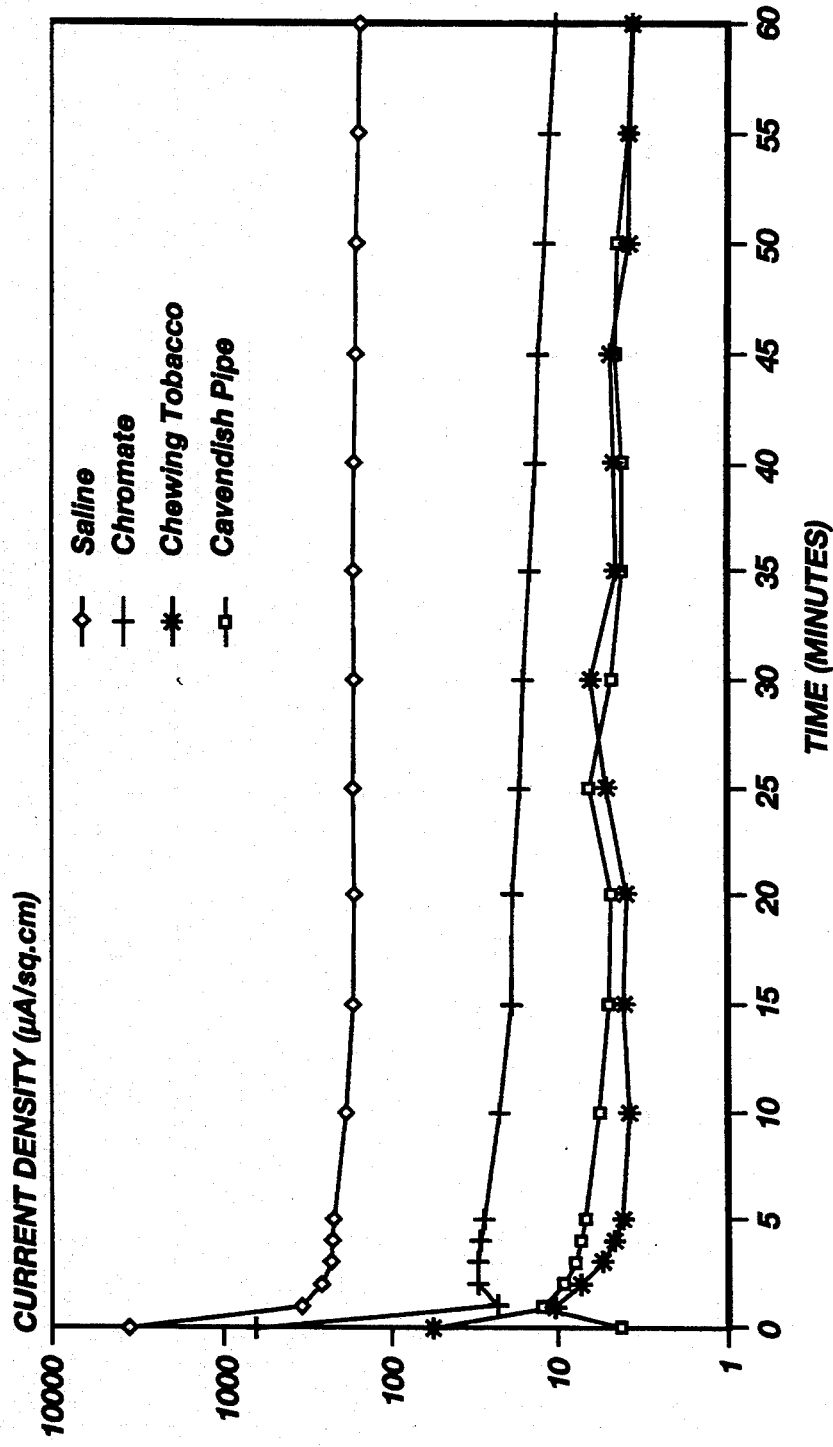
FIG. 5 is a current density/time relationship graph of a brass-platinum galvanic couple in solutions of saline, saline and potassium chromate, saline and chewing tobacco extract, and saline and pipe tobacco extract.

ZRA studies of brass coupled to platinum in 1% saline solution, with and without potassium chromate, smokeless tobacco extract and Cavendish smoking tobacco extract are shown in FIG. 5. Again, a lower current density denotes a greater degree of corrosion inhibition. Both tobacco extracts are considerably more effective corrosion inhibitors, i.e., produce a lower current density, than potassium chromate.

EXAMPLE 4

Figure 6:
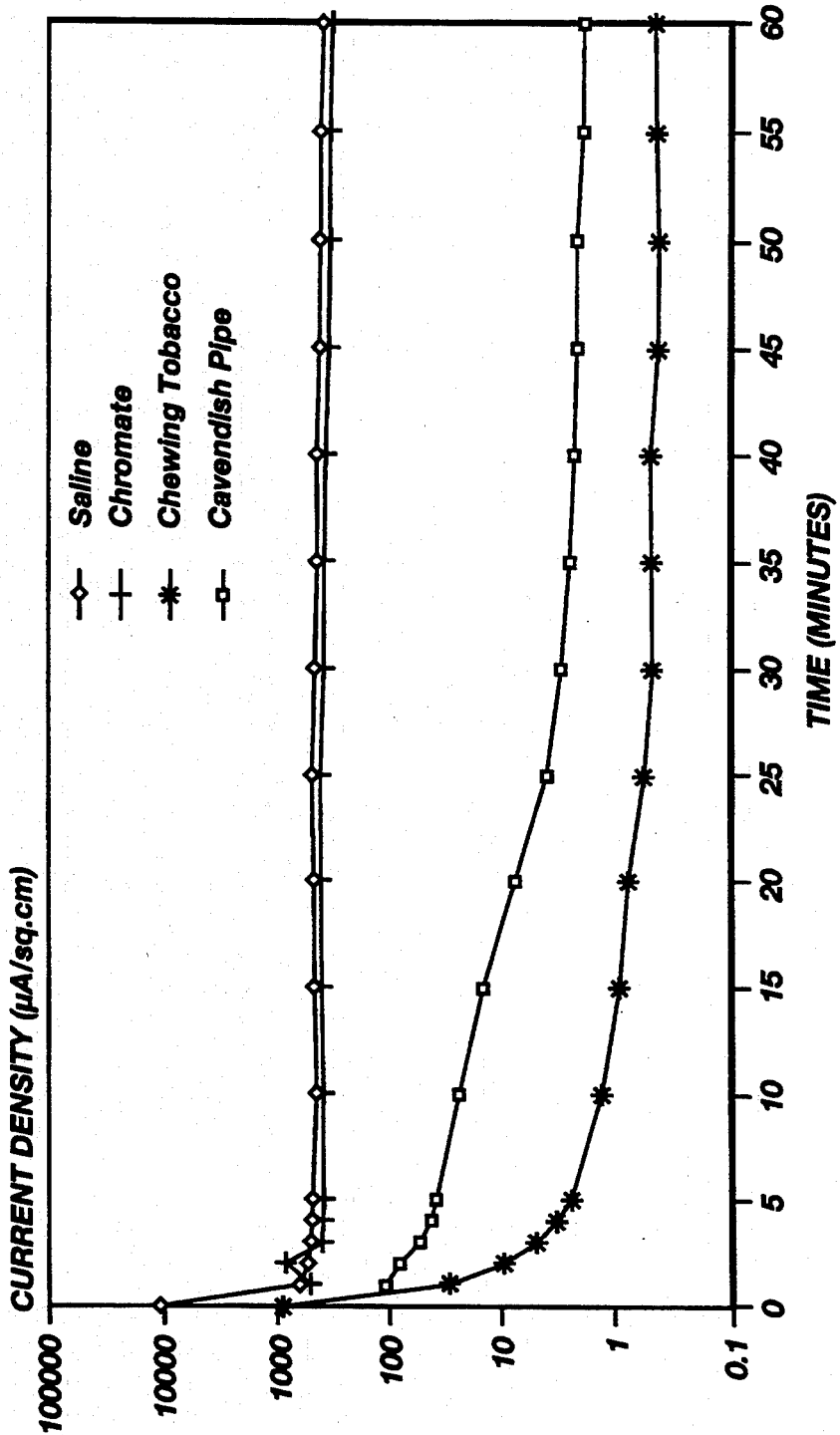
FIG. 6 is a current density/time relationship graph of a aluminum-platinum galvanic couple in solutions of saline, saline and potassium chromate, saline and chewing tobacco extract, and saline and pipe tobacco extract.

ZRA studies of aluminum coupled to platinum in 1% saline solution, with and without potassium chromate, smokeless tobacco extract and Cavendish smoking tobacco extract are shown in FIG. 6. A lower current density denotes a greater degree of corrosion inhibition. Both tobacco extracts are more effective corrosion inhibitors, i.e., produce a lower current density, than potassium chromate.

EXAMPLE 5

Figure 7:
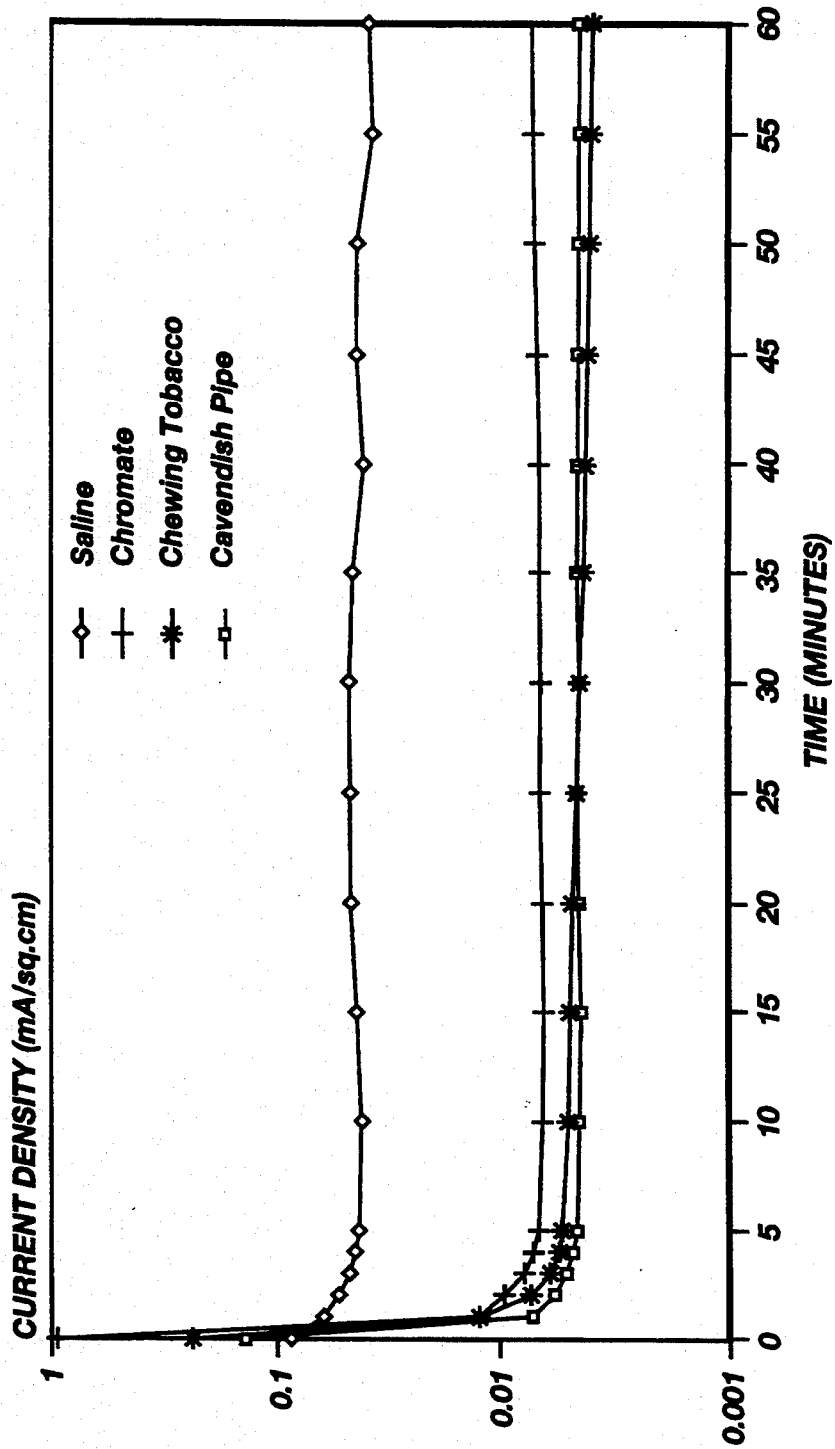
FIG. 7 is a current density/time relationship graph of a steel-brass galvanic couple in solutions of saline, saline and potassium chromate, saline and chewing tobacco extract, and saline and pipe tobacco extract.

ZRA studies of mild steel coupled to brass in 1% saline solution, with and without potassium chromate, smokeless tobacco extract and Cavendish smoking tobacco extract are shown in FIG. 7. A lower current density denotes a greater degree of corrosion inhibition. Both tobacco extracts are more effective corrosion inhibitors, i.e., produce a lower current density, than potassium chromate.

EXAMPLE 6

Figure 8:
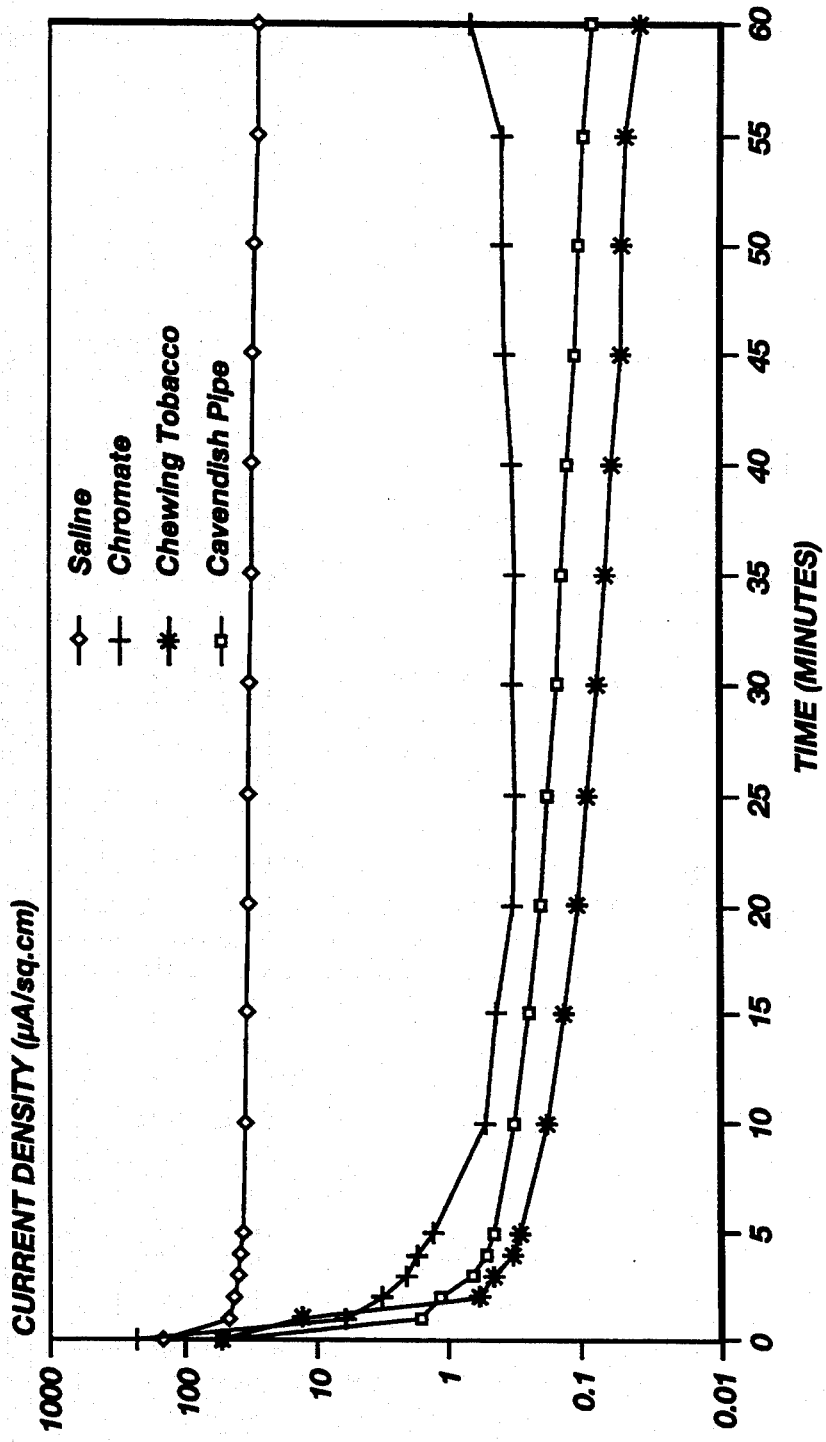
FIG. 8 is a current density/time relationship graph of a steel-aluminum galvanic couple in solutions of saline, saline and potassium chromate, saline and chewing tobacco extract, and saline and pipe tobacco extract.

ZRA studies of mild steel coupled to aluminum in 1% saline solution, with and without potassium chromate, smokeless tobacco extract and Cavendish smoking tobacco extract are shown in FIG. 8. A lower current density denotes a greater degree of corrosion inhibition. Both tobacco extracts are more effective corrosion inhibitors, i.e., produce a lower current density, than potassium chromate.

EXAMPLE 7

Figure 9:
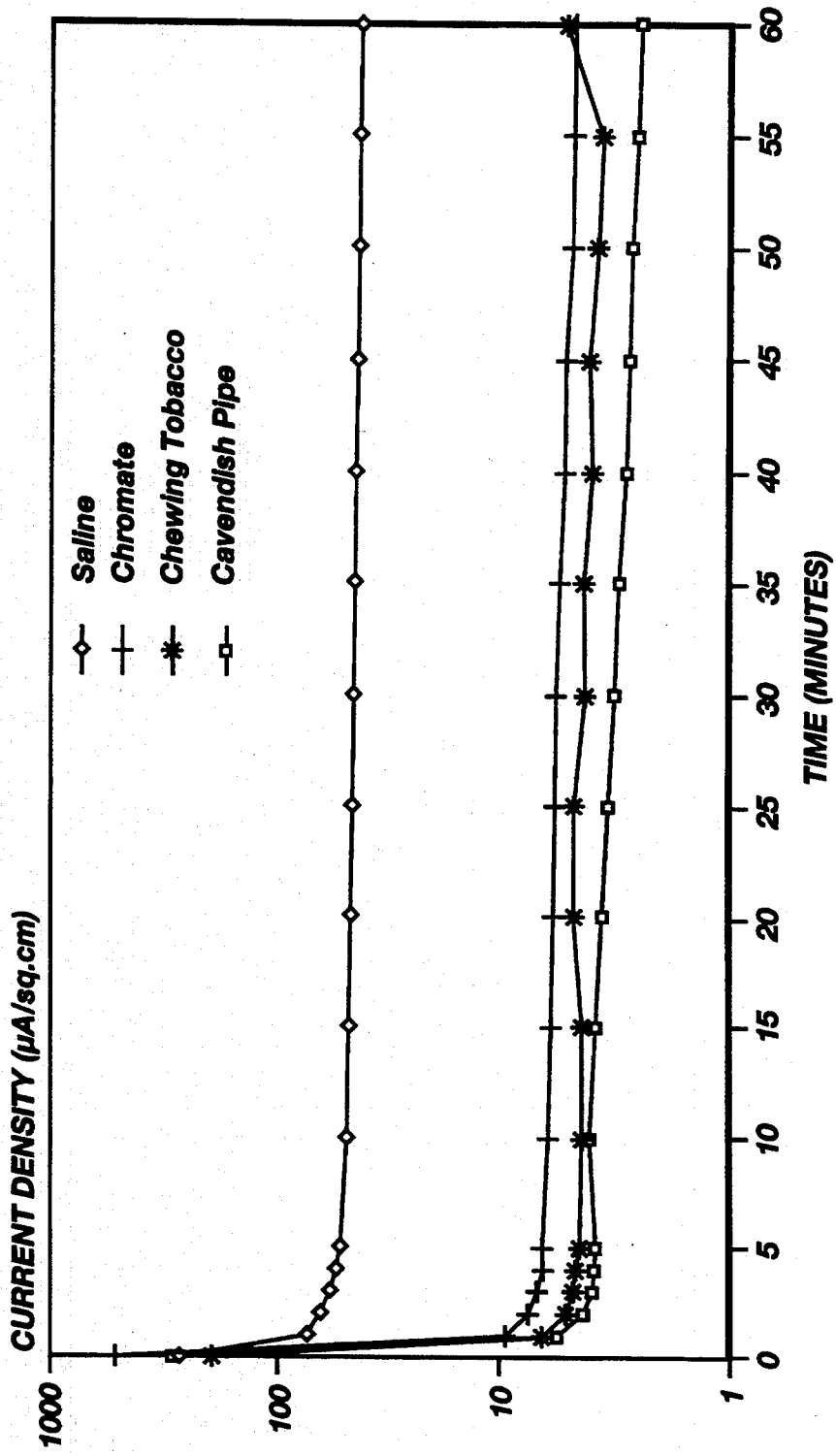
FIG. 9 is a current density/time relationship graph of a aluminum-brass galvanic couple in solutions of saline, saline and potassium chromate, saline and chewing tobacco extract, and saline and pipe tobacco extract.

ZRA studies of aluminum coupled to brass in 1% saline solution, with and without potassium chromate, smokeless tobacco extract and Cavendish smoking tobacco extract are shown in FIG. 9. A lower current density denotes a greater degree of corrosion inhibition. Both tobacco extracts are more effective corrosion inhibitors, i.e., produce a lower current density, than potassium chromate.

These data clearly demonstrate the effectiveness of aqueous tobacco extracts in corrosion inhibition.

EXAMPLE 8

Figure 10:
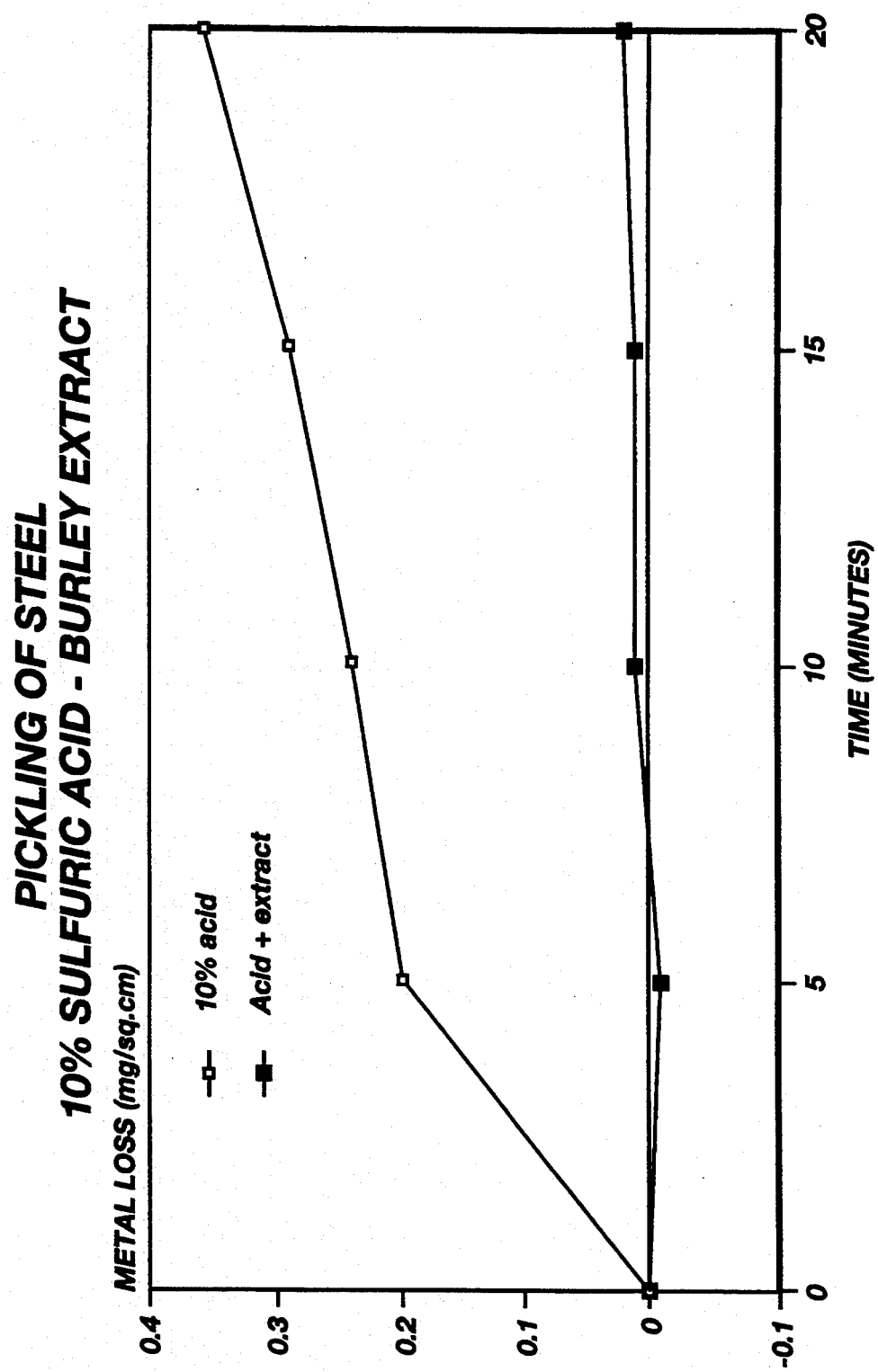
FIG. 10 is metal loss/time graph showing the surface loss of mild steel in a 10% sulfuric acid solution and a 5% tobacco extract concentration added to the 10% acid solution.

Additional work has been performed on corrosion inhibition of 10% sulfuric acid, a medium commonly used in the metal finishing and metal processing industries for descaling steel prior to electroplating, painting, and other surface coating procedures, as well as prior to most metal working operations. Scrap burley twigs and stems, after stripping of leaves and shoots for processing into tobacco products, were digested in 10% $H_2SO_4$ solution to provide a concentration of 5% extract in the acid. Mild steel was then immersed in plain acid and the acid-burley extract for 5 minute intervals up to a total of 20 minutes, weight changes being recorded after each 5 minute period. The weight loss data are shown in FIG. 10. As indicated, the 10% acid solution etched away surface metal in an essentially linear time relationship following an initial period of accelerated metal loss during the first five minute interval, whereas, the acid-barley extract maintained the metal loss at a near-zero level for at least 15 minutes before permitting the rate of metal loss to increase slightly some time during the fourth five minute period.

This work clearly demonstrates the inhibitive effect of burley twigs and stems, materials that are discarded during tobacco processing.

The extracted corrosion inhibitors may be used to treat metallic surfaces in any number of conventional methods, such as dip- or spray-coating, electrostatic coating, etc. In addition, the extracted corrosion inhibitors may be combined with, or otherwise formulated with, paint or other surface coating material, to effect the corrosion inhibiton of such painted or coated metallic surface.

From the foregoing it will be seen that this invention is one well adapted to attain all of the ends and objectives herein set forth, together with other advantages which are obvious and which are inherent to the composition and method. It will be understood that certain features and subcombinations are of utility and may be employed with reference to other features and subcombinations. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense.

What is claimed is:

1. A method of inhibiting corrosion on a metallic surface, comprising the steps of:
   a. introducing tobacco into an aqueous solution;
   b. filtering said aqueous solution to remove solid tobacco residue from said aqueous solution; and
   c. treating the metallic surface for a pre-determined period of time with the aqueous solution filtered in accordance with step "b";
   wherein the aqueous solution filtered in accordance with step "b" inhibits corrosion on the metallic surface.

2. A method as set forth in claim 1, further comprising the step of agitating said tobacco in said aqueous solution.

3. A method as set forth in claim 2, further comprising the step of heating said aqueous solution prior to the introduction of tobacco into said aqueous solution.

4. A method as set forth in claim 3, further comprising the step of heating said aqueous solution to a temperature of approximately 65° C. (149° F.).

5. A method as set forth in claim 3, further comprising the step of heating said aqueous solution during said agitating step in order to maintain said aqueous solution at a pre-determined approximate temperature.

6. A method as set forth in claim 2, wherein said agitating step is effected for at least approximately two hours.

7. A method of inhibiting corrosion on a metallic surface comprising the steps of:
   a. preparing at least a 1% by weight saline aqueous solution;
   b. introducing tobacco into said aqueous solution;
   c. filtering said aqueous solution to remove solid tobacco residue from said aqueous solution; and
   d. treating the metallic surface for a pre-determined period of time with the aqueous solution filtered in accordance with step "c"; wherein the aqueous solution filtered in accordance with step "c" inhibits corrosion on the metallic surface.

8. A method as set forth in claim 7, further comprising the step of agitating said tobacco in said aqueous solution.

9. A method as set forth in claim 8, further comprising the step of heating said aqueous solution prior to the introduction of tobacco into said aqueous solution.

10. A method as set forth in claim 9, further comprising the step of heating said aqueous solution to a temperature of approximately 65° C. (149° F.).

11. A method as set forth in claim 9, further comprising the step of heating said aqueous solution during said agitating step in order to maintain said aqueous solution at a pre-determined approximate temperature.

12. A method as set forth in claim 8, wherein said agitating step is effected for at least approximately two hours.

13. A method of inhibiting corrosion on a metallic surface, comprising the steps of:
   a. extracting metallic corrosion inhibitors from tobacco; and
   b. treating the metallic surface with the metallic corrosion inhibitors extracted in accordance with step "a";
   wherein the corrosion inhibitors extracted in accordance with step "a" inhibit corrosion on the metallic surface.

14. A method as set forth in claim 13, wherein step "b" includes the further steps of:
   c. mixing the metallic corrosion inhibitors with another metallic coating, and
   d. coating the metallic surface with the other metallic coating which includes the metallic corrosion inhibitor.

15. A method as set forth in claim 14, wherein the other metallic coating is paint.

* * * * *